US009094288B1

(12) United States Patent (10) Patent No.: US 9,094,288 B1
Nucci et al. (45) Date of Patent: Jul. 28, 2015

(54) AUTOMATED DISCOVERY, ATTRIBUTION, ANALYSIS, AND RISK ASSESSMENT OF SECURITY THREATS

(75) Inventors: Antonio Nucci, San Jose, CA (US); Sabyasachi Saha, Sunnyvale, CA (US)

(73) Assignee: Narus, Inc., Sunnyvale, CA (US)

(*) Notice: Subject to any disclaimer, the term of this patent is extended or adjusted under 35 U.S.C. 154(b) by 452 days.

(21) Appl. No.: 13/282,010

(22) Filed: Oct. 26, 2011

(51) Int. Cl.
*H04L 29/06* (2006.01)
*H04L 12/26* (2006.01)
*H04L 12/24* (2006.01)

(52) U.S. Cl.
CPC ............. *H04L 43/026* (2013.01); *H04L 41/142* (2013.01)

(58) Field of Classification Search
USPC .......................................................... 726/23
See application file for complete search history.

(56) References Cited

U.S. PATENT DOCUMENTS

| | | | | |
|---|---|---|---|---|
| 7,603,711 | B2* | 10/2009 | Scheidell | 726/24 |
| 7,644,150 | B1* | 1/2010 | Nucci et al. | 709/223 |
| 8,042,180 | B2* | 10/2011 | Gassoway | 726/22 |
| 8,230,505 | B1* | 7/2012 | Ahrens et al. | 726/23 |
| 8,418,249 | B1* | 4/2013 | Nucci et al. | 726/23 |
| 2002/0144156 | A1* | 10/2002 | Copeland, III | 713/201 |
| 2002/0166063 | A1* | 11/2002 | Lachman, III et al. | 713/200 |
| 2004/0015719 | A1* | 1/2004 | Lee et al. | 713/201 |
| 2005/0262562 | A1* | 11/2005 | Gassoway | 726/22 |
| 2007/0143847 | A1* | 6/2007 | Kraemer et al. | 726/23 |
| 2011/0271341 | A1* | 11/2011 | Satish et al. | 726/23 |

OTHER PUBLICATIONS

Erman, Jeffrey, et al. "Offline/realtime traffic classification using semi-supervised learning." Performance Evaluation 64.9 (2007): 1194-1213.*
Proactive Detection of Computer Worms Using Model Checking, Kinder, J. ; Katzenbeisser, S. ; Schallhart, C. ; Veith, H. Dependable and Secure Computing, IEEE Transactions on vol. 7 , Issue: 4, DOI: 10.1109/TDSC.2008.74 Publication Year: 2010 , pp. 424-438.*
Chandola, Varun, et al., "Data Mining for Cyber Security", Book chapter in "Data Warehousing and Data Mining Techniques for Computer Security", Springer, 2006, Department of Computer Science, University of Minnesota, pp. 1-20.
Masud, Mohammad M., et al., "Classification and Novel Class Detection in Concept—Drifting Data Streams under Time Constraints", IEEE Transactions on Knowledge and Data Engineering, vol. 23, No. 6, Jun. 2011, pp. 859-874.

* cited by examiner

*Primary Examiner* — Harris Wang
(74) *Attorney, Agent, or Firm* — Kwan & Olynick LLP

(57) ABSTRACT

A method for profiling network traffic of a network. The method includes obtaining a signature library comprising a plurality of signatures each representing first data characteristics associated with a corresponding application executing in the network, generating, based on a first pre-determined criterion, a group behavioral model associated with the signature library, wherein the group behavioral model represents a common behavior of a plurality of historical flows identified from the network traffic, wherein each of the plurality of signatures correlates to a subset of the plurality of historical flows, selecting a flow in the network traffic for including in a target flow set, wherein the flow matches the group behavioral model without being correlated to any corresponding application of the plurality of signatures, analyzing the target flow set to generate a new signature, and adding the new signature to the signature library.

30 Claims, 7 Drawing Sheets

AUTOMATED DISCOVERY, ATTRIBUTION, ANALYSIS, AND RISK ASSESSMENT OF SECURITY THREATS

BACKGROUND OF THE INVENTION

1. Field of the Invention

The present invention relates to computers and computer networks. More particularly, the invention relates to profiling Internet traffic flows to identify network applications and/or security threats responsible for the traffic flows.

2. Background of the Related Art

In the past years, the number of cyber attacks keeps increasing affecting millions of systems. Such malicious activities, often termed as Malware (acronym from malicious software), includes different worms, botnets, trojans, backdoors, spyware, etc. Then, there is a new trend in exploiting social networks and mobile devices. Also, the sophistication and effectiveness of cyber-attacks have steadily advanced. These attacks often take advantage of flaws in software code, use exploits that can circumvent signature-based tools that are commonly used to identify and prevent known threats, and social engineering techniques designed to trick the unsuspecting user into divulging sensitive information or propagating attacks. These attacks are becoming increasingly automated with the use of botnets-compromised computers that can be remotely controlled by attackers to automatically launch attacks. Bots (short for robots) have become a key automation tool to speed the infection of vulnerable systems and are extremely stealthy in the way they communicate and ex-filtrate personal/proprietary information from the victims' machines/servers. The integration of such sophisticated computer attacks with well-established fraud mechanisms devised by organized crime has resulted in an underground economy that trades compromised hosts, personal information, and services in a way similar to other legitimate economies. This expanding underground economy makes it possible to significantly increase the scale of the frauds carried out on the Internet and allows criminals to reach millions of potential victims.

Such continuous and ever changing challenges to protect the users has made cyber-security is a very active and bleeding-edge research. This has become an arm race between the security researchers and malicious users. Today's approach to information security can be broken down into two major classes of technologies, host security, and network security.

A prevalent category of host-based security is malware prevention, comprising a broad group of agent-based solutions that look for particular signatures and behavioral signs of malicious code execution at the host level. This approach, known as blacklisting, focuses on matching specific aspects of application code and particular actions being attempted by applications for detection. Signature-based/blacklisting detection has been around for many years. In that same time, viruses, worms, sniffers, trojans, bots and other forms of malware have infiltrated e-mail, instant messaging, and later, social networking sites for the purpose of criminal financial gain. With improvements in correlation and centralized management, blacklisting still works very effectively in most distributed enterprise and capable to (i) pinpoint malicious activities with high detection rate while very low false positive/false negative rates, (ii) reverse engineering the malware executable to highlight malware inner properties such as message structure and message passing (strengths and weaknesses of the malware), and (iii) assess the level of risk of the threat by analyzing effects to the end-host (such as system calls, registries being touched, etc). However, because these signature-based models depend on advanced knowledge of malicious code and behaviors, some instances can be missed, leading to potential malicious execution.

On the network side, three prevalent approaches are blended together to offer network-based security, (i) firewall systems, (ii) intrusion detection/prevention systems (IDS/IPS) and (iii) network behavior anomaly detection (NBAD) systems. These three different approaches complement each other and are commonly adopted/deployed by enterprises to form a holistic network security strategy. Generally, the first two approaches tackle the network security problem in a similar fashion as the host security (usage of threat signatures specialized at the network level), and thus prone to similar benefits and shortfalls as for the host security. The third approach attempts to discover threats without requiring a-priori knowledge of the malicious code and behavior by using algorithms to generate model(s) that retain(s) the properties of good traffic and alarm for sessions that do not conform to the model. While effective in spotting threats never seen before, the third approach is still prone to high rate of false positive/false negative that the security analyst is forced to screen before making a decision. This shortfall is mostly due to the lack of a solid ground truth that the statistical tools can be trained on to produce precise statistical models emulating the threat activities.

SUMMARY

In general, in one aspect, the present invention relates to a method for profiling network traffic of a network. The method includes obtaining a signature library comprising a plurality of signatures each representing first data characteristics associated with a corresponding application executing in the network, generating, by a processor of a computer system based on a first pre-determined criterion, a group behavioral model associated with the signature library, wherein the group behavioral model represents a common behavior of a plurality of historical flows identified from the network traffic, wherein each of the plurality of signatures correlates to a subset of the plurality of historical flows, selecting, by the processor, a flow in the network traffic for including in a target flow set, wherein the flow matches the group behavioral model without being correlated to any corresponding application of the plurality of signatures, analyzing, by the processor, the target flow set to generate a new signature, and adding the new signature to the signature library.

In general, in one aspect, the present invention relates to a system for profiling network traffic of a network. The system includes a signature library comprising a plurality of signatures each representing first data characteristics associated with a corresponding application executing in the network, a statistical model generator executing on a processor of a computer system and configured to generate, based on a first pre-determined criterion, a group behavioral model associated with the signature library, wherein the group behavioral model represents a common behavior of a plurality of historical flows identified from the network traffic, wherein each of the plurality of signatures correlates to a subset of the plurality of historical flows, a statistical classifier executing on the processor and configured to select a flow in the network traffic for including in a target flow set, wherein the flow matches the group behavioral model without being correlated to any corresponding application of the plurality of signatures, and a signature generator executing on the processor and configured to analyze the target flow set to generate a new signature and add the new signature to the signature library.

In general, in one aspect, the present invention relates to a computer readable medium storing instructions, when executed by the computer to profile network traffic of a network, the instructions include functionality for obtaining a signature library comprising a plurality of signatures each representing first data characteristics associated with a corresponding application executing in the network, generating, based on a first pre-determined criterion, a group behavioral model associated with the signature library, wherein the group behavioral model represents a common behavior of a plurality of historical flows identified from the network traffic, wherein each of the plurality of signatures correlates to a subset of the plurality of historical flows, selecting a flow in the network traffic for including in a target flow set, wherein the flow matches the group behavioral model without being correlated to any corresponding application of the plurality of signatures, analyzing the target flow set to generate a new signature, and adding the new signature to the signature library.

Other aspects and advantages of the invention will be apparent from the following description and the appended claims.

DETAILED DESCRIPTION

Figure 1A:
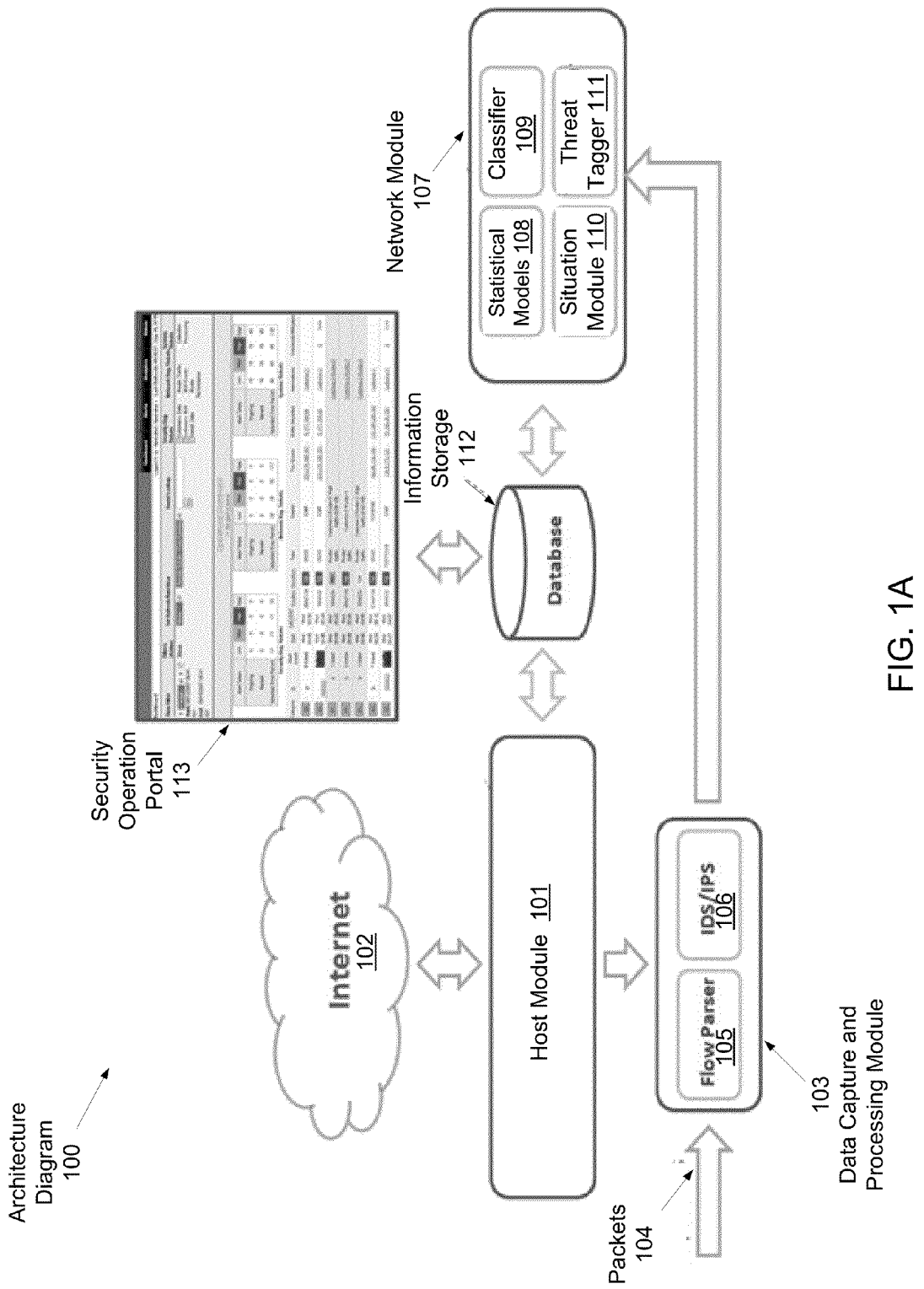
FIG. 1A shows an architecture diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Generally speaking, a traffic stream (or flow) between two network hosts is a series of data records regarding the communication between the two network hosts engaged in a Internet transaction. Each traffic stream is uniquely defined by a 5-tuple identifier (i.e., source address, destination address, source port, destination port, and transport protocol). Throughout this document, the terms "traffic flow", "flow", "traffic stream" and "stream" are used interchangeably.

When a data record of the traffic stream includes the entire packet (i.e., packet header and payload content), the traffic stream includes full packet visibility. Full packet visibility represents the finest level of information that can be collected for an Internet transaction.

From time to time, only information about packet headers (i.e., without payload content) can be collected for an Internet transaction. When a data record of the traffic stream includes only packet header, the traffic stream includes the traffic flow visibility only. Traffic flow visibility represents the second finest level of information that can be collected for an Internet transaction. In this case, an Internet transaction between two network hosts can only be partially reconstructed by grouping all packet headers with a common 5-tuple identifier (i.e., source address, destination address, source port, destination port, and transport protocol), while the fingerprint (at the packet payload level) of the application involved in such a transaction is lost.

In one or more embodiments of the invention, classifying an application with only traffic flow visibility is performed by leveraging statistical properties of the flow. Example of such statistics are average and standard deviation of packet sizes in the flow, or minimum, average, and maximum inter-arrival packet times in the flow, etc.

One way to collect traffic flows from the network is to leverage the router infrastructure. All routers today are capable to provide such information via protocols such as Netflow® (a registered trademark of Cisco Systems, Inc., San Jose, Calif.) or the equivalent JFlow® (a registered trademark of Juniper Networks, Inc., Sunnyvale, Calif.). Sampling techniques are often applied when routers are used to collect such information in order to reduce the amount of processing time required to carry over such a task. For example, Cisco routers are typically deployed with packet sampling rate 1:200 (or 1:1000), meaning that not all packet headers of a traffic flow are visible but only 1 out 200 packets of a flow (or 1 out of 1000 packets). Packet headers identified from a sampled version of a traffic flow is referred to as netflow-like records and the sampled version of the traffic stream includes the netflow-like record visibility only. Throughout this document, packet headers identified from non-sampled traffic flows or netflow-like records identified from sampled traffic flows are generally referred to as packet header records.

Malware detection approaches may be broadly categorized into two categories: anomaly-based and signature-based detection. Signature based detection uses the characterization of what is considered as malicious to decide the maliciousness of the program under inspection. For example, a Common N-Gram classification method may be used to create malware profile signatures. Specifically, signatures are extracted based on the probability of finding an n-gram in the payloads of virus or clean files. For example, the signature-based detection may be based on the aforementioned full packet visibility. Signature matching and behavior of existing malware can be used for detection. Useful signatures of existing malware provided great guidance in malware detection. Once a signature has been created, it is added to the signature based method's knowledge. A major weakness of the signature based approach is that they failed to detect the zero-day attacks, which are new attacks without any historical flows to enable signature extraction. Also it fails to detect threats that keep changing, for example, polymorphic and metamorphic malwares. For example, metamorphic malware automatically reprogram itself every time it is distributed or propagated. So, they will be difficult to capture with signature based approach as their signatures will also keep changing. Similarly, the polymorphic malwares are also difficult to identify using this technique as they self-mutates and use encryption.

On the other hand, an anomaly-based detection technique uses the knowledge of what is considered as good behavior to identify the anomaly as malicious program. A special type of anomaly based detection is specification-based detection. Specification based detection makes use of certain rule set of what is considered as good in order to decide the maliciousness of the program violating the predefined rule set. The programs violating the rule set are considered as malicious program. For example, the anomaly-based detection may be based on the aforementioned traffic flow visibility. The key advantage of anomaly-based detection is its ability to detect zero-day attacks. As noted above, zero-day attacks are attacks that are previously unknown to the malware detector system. There are two major limitation of this technique: Firstly, its high false alarm rate, which means high proportion of good programs are wrongly identified as malicious. Secondly, the complexity involved in determining what features should be learned in the training phase.

Embodiments of the invention provide a comprehensive end-to-end data security system for real-time discovery, analysis, risk assessment and attribution of information security threats by tightly blending together the host-based security (also referred to as host-security or host-view) and network-based security (also referred to as network-security or network view) in a way to provide the analysts the benefits of both while reducing their respective shortfalls. By crawling malware distribution sites for malware executables and by analyzing how the threat behaves in a sand-box environment (i.e., controlled), the host-view provides the system with unique insights into how the compromised machines communicate to malevolent servers and what is the most likely goal they have been designed for. Furthermore, by accessing and analyzing the executable code, the host view can automatically extract the threat state machine or threat signature. Generally, this precise and information-rich view can only be leveraged with knowledge that machines have been compromised (i.e., after-the-fact) and activated and more importantly with pre-knowledge of the malware executable code. To overcome these limitations, the network-view is also used, which is a more complete and macroscopic view of the network activity that exhibits common and persistent behavioral patterns shared by compromised hosts in the network. Statistical models are generated by training the models on flows tagged using the threat signatures provided by the host-view. Accordingly, the models are tuned both to capture the holistic properties shared by the malicious threat across as a whole (and thus capable to spot new ones) and to model the behavior of each of the discovered threat (and thus capable to discover the known threats even in case the malicious sessions may be encrypted to bypass traditional IDS and firewall network systems). As a consequence, false positive/negative is reduced to present more precise evidence of suspicious activities allowing the analyst to focus on events that require immediate attention. Furthermore, the network security framework will inspect flow payloads associated with suspicious flows to automatically extract the threat state-machines and executables, if present in the suspicious flow payloads, for providing to the host-security regarding potential threats that did not touch any of the monitored machines yet (and thus still unknown to the host security).

Also, from the macroscopic network view, it is possible to extract the information and behavior of all individual hosts. This helps to augment the analysis with situational awareness of the individual hosts. This involves analysis of communication graph of each host, type of each communication, reputation and location of the hosts it has communicated. Accordingly, communication behavioral patterns may be analyzed to identify anomalies in the malicious hosts' behavior.

FIG. 1A shows an architecture diagram (100) in accordance with one or more embodiments of the invention. As shown, the architecture diagram (100) includes host module (101), Internet (102), data capture and processing module (103), network module (107), information storage (112), and security operation portal (113).

In one or more embodiments, the host module (101) constantly searches the Internet (102) for malware executables. Specifically, the host module (101) downloads and installs the executable and analyzes the system calls and registry accesses (e.g., using binary program analysis including both static and dynamic analysis of executable code); furthermore, it studies the way the compromised machine (e.g., a bot) communicates back to the malevolent server (e.g., a command-and-control server of a botnet) and automatically extrapolates the complete state machine of the protocol being used, including a detailed understanding of the message format and passing mechanism; finally it provides the data capture and processing module (103) (more specifically, the IDS/IPS module (106)) with newly discovered signatures. The generated signatures are payload based and thus cannot detect malicious flows when they are encrypted. Also, it fails to capture zero-day threats.

In one or more embodiments, the data capture and processing module (103) collects the data in the form of full packets, packet headers and flow information. It uses a high speed capture card for capturing full packets. This module is capable of aggregating flow information and use flow parser (105) to extract all the flow level features. This module also has an intrusion detection/prevention system (IDS/IPS (106)) that leverages the work done by the host module (101) and runs the generated rules against incoming packets (104) where it searches deep within the packet payloads for matches; when there is a match, that flow is labeled appropriately, otherwise the flow is labeled as unknown.

In one or more embodiments, the network module (107) includes classifier (109) that analyzes the wider network traffic activity and classifies suspicious traffic patterns and associated hosts/servers in real-time according to pre-computed statistical models (108) that are generated in an off-line fashion and made available at regular times. The statistical models (108) are generated using machine learning algorithms to correlate statistical flow feature vectors (i.e., extracted on a per-flow basis by the flow parser (105)) and associated flow labels (provided by the IDP/IPS module (106)). Incoming flows that are matched to a specific threat model (i.e., one of the statistical models (108) associated with malicious activity) by the classifier (109) are immediately forwarded to the database in the information storage (112). On the other hand, flows that do not sufficiently match any of the threat models but that still retain the properties of malicious behavior are further analyzed by the threat tagger (111) at the payload level to resolve the threat identity by extracting the state machine shared by such flows and scoring the level of similarity between the newly extracted state machine and the ones available to the host module (101).

The network module (107) also involves an offline graph analysis engine (i.e., situation module (110)) to provide situational awareness knowledge and visibility into communication patterns annotated from the collected flows. It identifies suspicious hosts' behaviors which are not already labeled. Based on the behaviors of the hosts detected by the host module (101), situation module (110) builds a model to separate out anomalous behavior from the regular one. Once the behavioral model is available, threats that are analogous to the previous ones can be identified without depending on payload signatures. Also, studying the communication behavior of the hosts facilitates identifying a group of unfamiliar behaviors in the network. In either case, situation module (110) collects the group of flows and sends them to threat tagger (111) to generate the corresponding state machines, which are then sent to the host module (101).

In one or more embodiments, the information storage (112) stores all the data, associated labels, all information about threats, generated signatures, etc. The information storage (112) includes two portions: flow data storage and output databases. The flow data storage stores all flow payloads, flow features associated with threat labels, information about the threats with payload signatures, associated state machines, network connectivity information, etc. On the other hand, the generated behavioral patterns, risk assessment, labels and communities of hosts and servers engaged in the same or similar malevolent activity are stored into databases and displayed, for example through a web based user interface such as the security operation portal (113).

Although the architecture diagram (100) is described in the specific context of detecting malicious activities in the Internet (102), the techniques to combine host-based profiling and network-based profiling in a closed loop system are also applicable for profiling general network traffic to model behavioral characteristics of applications executing in the network and to label individual flows based on such behavioral models. Such techniques are described in reference to FIG. 1B and FIG. 2 below.

Figure 1B:
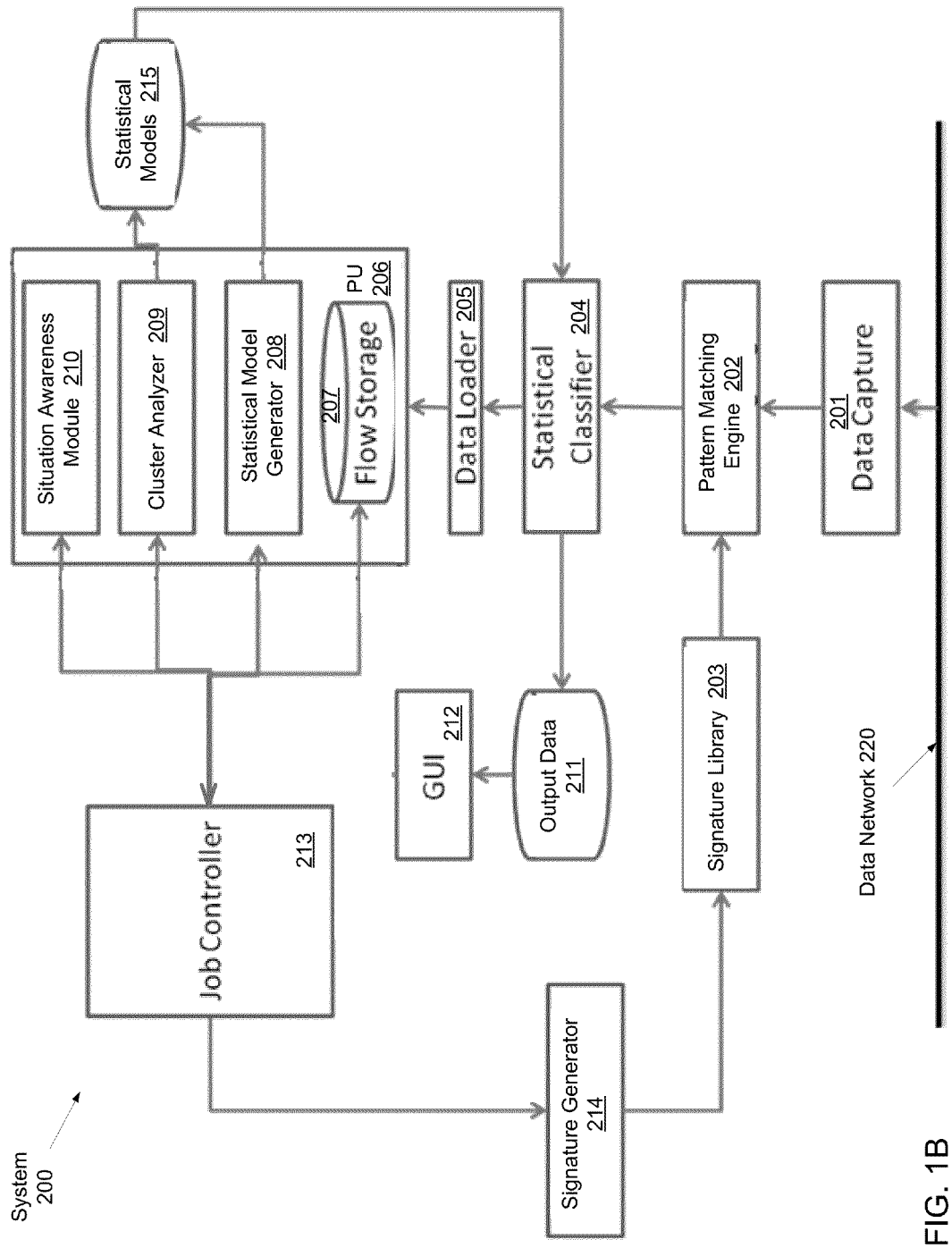
FIG. 1B shows a system block diagram according to aspects of the invention.

FIG. 1B shows a system block diagram of a system (200) in accordance with one or more embodiments of the invention. Those skilled in the art, having the benefit of this detailed description, will appreciate the components shown in FIG. 1B may differ among embodiments of the invention, and that one or more of the components may be optional. Although specific numbers of components are shown in FIG. 1B, different number of each component may be included. In one or more embodiments of the invention, one or more of the components shown in FIG. 1B may be omitted, repeated, supplemented, and/or otherwise modified from that shown in FIG. 1B. Accordingly, the specific arrangement of components shown in FIG. 1B should not be construed as limiting the scope of the invention.

A shown in FIG. 1B, the system (200) includes data network (202), data capture module (201), pattern matching engine (202), signature library (203), statistical classifier (204), data loader (205), processing unit (PU) (206), statistical models (215), job controller (213), signature generator (214), output data repository (211), and graphical user interface (GUI) (212). Further, the DU (206) includes flow storage (207), statistical model generator (108), cluster analyzer (209), and situation awareness module (210). The data network (220) may include wired and/or wireless portions of the Internet and/or other data communications networks such as wide area networks (WANs), local area networks (LANs), etc. The output data repository (211), flow storage (207), statistical models (215), or combinations thereof may be a data store such as a database, a file system, one or more data structures (e.g., arrays, link lists, tables, hierarchical data structures, etc.) configured in a memory or other suitable medium for storing data. As shown in FIG. 1B, an arrow between modules of the system (200) represent output data generated by a source module with or without at least a portion of input data passed through the source module. Generally, the signature library (203), the pattern matching engine (202), and the data capture module (201) correspond to the host-based security tasks depicted in FIG. 1A, while the statistical classifier (204), the PU (206), the statistical models (215), and the signature generator (214) correspond to the network-based security tasks depicted FIG. 1A.

In one or more embodiments, the data capture module (201) is configured to observe and collect information regarding traffic streams (e.g., packet headers and/or full packet streams) and to filter and organize the collected traffic stream data regarding duplicate records or out-of-order records. Specifically, the data capture module (201) extracts the payload and the flow-features for sending to the pattern matching engine (202) and the statistical classifier (204). For example, the data capture module (201) includes functionality of the flow parser (105) of FIG. 1A that extracts statistical features on a per-flow basis while the pattern matching engine (202) corresponds to the IDS/IPS (106) of FIG. 1A that analyzes these received packets and generates flow labels based on existing payload based signatures in the signature library (203). In particular, these signatures correspond to applications executing in the data network (220) and may be generated by the host module (101) of FIG. 1A to represent data characteristics associated with the corresponding applications. For example, the host module (101) may generate each signature by analyzing a set of historical flows generated from a corresponding application. In the context of FIG. 1A, the signature is associated with a malicious activity generated by a malware application. In one or more embodiments, each of these signatures is a layer 7 signature generated by analyzing layer 7 contents of collected historical flows. In one or more embodiments, in addition to pre-existing signatures, the signature library (203) is periodically extended by including new signatures generated by the signature generator (214).

Common behavior may exist among flows matching any signature in the signature library (203). In the context of FIG. 1A where each signature is associated with a malicious activity generated by a malware application, flows matching any of these signatures exhibit some common malicious behavior. In one or more embodiments, a group behavioral model is generated by the statistical model generator (208) to represent a common behavior associated with the signature library (203). Specifically, the common behavior is exhibited by a set of historical flows associated with the signature library (203). In one or more embodiments, these historical flows may be identified from the output of the data capture module (201) by the pattern matching engine (202) as matching any signature in the signature library (203). In one or more embodiments, these historical flows may be identified from the output of the data capture module (201) by the statistical classifier (204) as matching any behavior model corresponding to a signature in the signature library (203). Accordingly, each signature matches a corresponding subset (referred to as the matched subset) of these historical flows in the sense that the signature or a behavior model thereof is matched to flows in the corresponding subset. In the context of FIG. 1A where each signature is associated with a malicious activity, the group behavioral model is referred to as a threat model representing common behavior of multiple malicious activities. In one or more embodiments, determining a match requires a confidence measure of a comparison associated with the match to exceed a pre-determined level.

In one or more embodiments, the group behavioral model is generated by analyzing layer 3 and layer 4 contents of the set of historical flows based on a supervised machine learning algorithm. Using the same supervised machine learning algorithm, the statistical model generator (208) is further configured to analyze, for each signature in the signature library (203), a matched subset of the historical flows to generate a corresponding behavioral model representing specific behavior exhibited in the matched subset. Such behavior model is in turn used to further identify additional flows to be added to the set of historical flows in a recursive manner. In particular, the corresponding behavioral model is generated by analyzing layer 3 and layer 4 contents of the matched subset based on the supervised machine learning algorithm. As shown in FIG. 1B, the group behavior model associated with the signature library (203) and other behavior models each associated with an individual signature in the signature library (203) are stored as the statistical models (215) to be used by the statistical classifier (204). In one or more embodiments, the statistical models (215) are generated based on the aforementioned layer 3 and layer 4 contents and are referred to as layer 3 and layer 4 models.

Figure 3A:
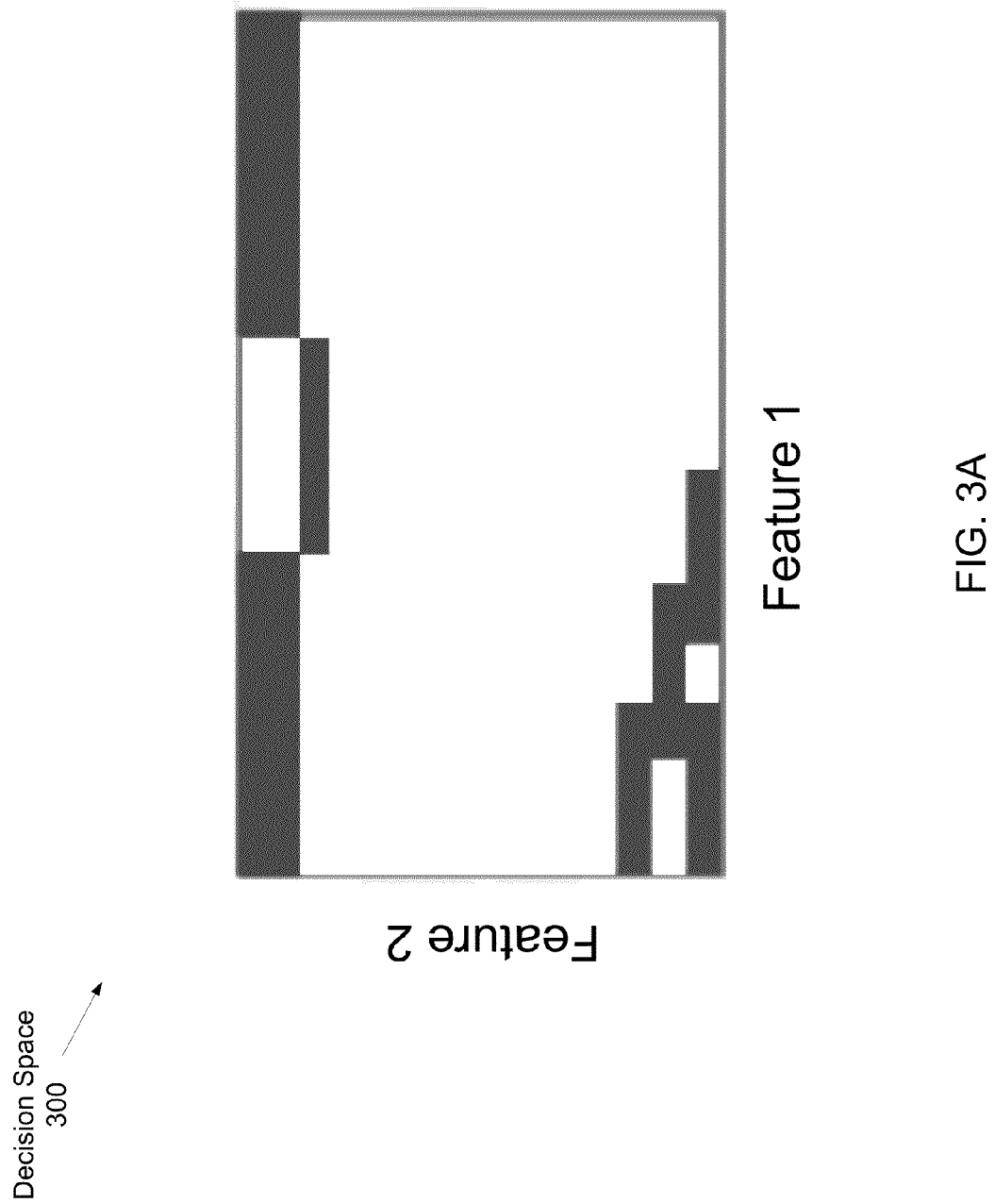
FIGS. 3A and 3B show examples according to aspects of the invention.

In one or more embodiments, the supervised machine learning algorithm takes flow-based features from the data capture module (201) as input. Example features are listed in TABLE 1 below. Accordingly, each flow is represented by a vector of these features in the output of the data capture module (201) that is sent to the statistical model generator (208) passing through the intervening modules in the system (200). Note that for some flow, some of these features may be missing and the vector may be in sparse format. At any single time based on the flow-based features (i.e., feature vectors) observed to that time point, the statistical model generator (208) creates a decision boundary for identifying flows exhibiting the aforementioned common behavior associated with the signature library (203) or for identifying flows exhibiting the aforementioned specific behavior associated with a particular signature in the signature library (203). For example, the statistical model generator (208) may create a decision boundary for identifying general malicious flows labeled by macro-profiling or a particular class of malicious flows labeled by micro-profiling. The task of the statistical model generator (208) is to identify the important features that are responsible for creating the boundary. FIG. 3A shows an example two dimensional decision space (300) defined by example feature 1 and feature 2, which are identified as the important features for creating the boundary. The statistical model generator (208) may generate similar subspaces in a higher dimension with more than two features. The dark segments in the two dimension space represent a threat region defined by the aforementioned boundary. For the example where the decision space (300) corresponds to a behavior model associated a particular signature in the signature library (203), the threat region represents the specific behavior of flows matching the particular signature. For the example where the decision space (300) corresponds to the group behavior model, the threat region encompasses all the individual threat region of each behavior model associated with each signature in the signature library (203).

TABLE 1 sport: source port
dport: destination port
protocol: protocol used
direction: client to server and server to client
pkts: number of packets
total count of packets without payload
bytes: total number of bytes
pay_bytes: total number bytes from all payloads
Duration: Client to server (c2s) and server to client (s2c)
(max, min, avg, std) of pkt_size
IAT (1 to 10): inter-arrival time
(max, min, avg, std) of pay_size: payload size
TCP flags: acks, fins, resets, pushs, urgs, cwrs, eces
pkt(X)_size: size of pkt X, X = 1 . . . 10
IAT_(X): inter arrival times, X = 1 . . . 10
pay(X)_size: payload sizes, X = 1 . . . 10

In one or more embodiments, the group behavior model and the behavior model in the statistical models (215) are used by the statistical classifier (204) to classify, in real time, a flow from the data network (220) based on the feature vector of the flow generated by the data capture module (201). Specifically, the statistical classifier (204) is configured to analyze the flow to identify whether the flow matches the group behavioral model associated with the signature library (203) or matches any behavior model associated with any signature in the signature library (203). For the example where the decision space (300) corresponds to the group behavior model, the flow is identified as matching the group behavior model if it falls into the threat region. For the example where the decision space (300) corresponds to a behavior model associated with a particular signature, the flow is identified as matching the particular behavior model if it falls into the threat region. In the context of FIG. 1A, the statistical classifier (204) uses the group behavior model to identify whether the flow is malicious or not. If the flow is identified as malicious, the statistical classifier (204) uses the behavior models to identify a particular threat label corresponding to one of the signatures in the signature library (203). The outputs of the statistical classifier (204) are then stored in the output data repository (211) for viewing by a security analyst via the GUI (212). An example screenshot generated by the GUI (212) is depicted as the security operation portal (113) in FIG. 1A.

While the pattern matching engine (202) is capable of tagging flows with threat labels by matching data patterns in the flow to signatures in the signature library (203), a flow with encrypted payload data may escape detection by the pattern matching engine (202). In one or more embodiments, the statistical classifier (204) classifies each flow not labeled by the pattern matching engine (202) using the statistical models (215).

In one or more embodiments, the statistical classifier (204) is further configured to generate a suspicious flag for flows that are unforeseen to the statistical classifier (204). This is crucial to deal with the zero-day attacks. The suspicious flag is raised when the statistical classifier (204) finds high level of uncertainty and cannot classify the flow by matching to one of the existing behavior models with high confidence. In one or more embodiments, the suspicious flag is raised when the statistical classifier (204) determines that the flow matches the group behavioral model but a correlation between the flow and any corresponding application of the signatures is not meeting a pre-determined level. For example, the correlation may be determined simply by the result of the pattern matching engine (202) comparing the flow to signatures in the signature library (203). In addition, the correlation may also be determined by the result of the statistical classifier (204) comparing the flow to the corresponding behavioral model for each of the signatures in the signature library (203) without using the signatures themselves. Accordingly, the flow is included in a target flow set if tagged with the suspicious flag, i.e., if the flow is determined as matching the group behavioral model without the correlation meeting the pre-determined level. In one or more embodiments, the target flow set is stored in the flow storage (207).

In one or more embodiments, the cluster analyzer (209) is configured to analyze, when a size of the target flow set exceeds a pre-determined size, the target flow set to identify a plurality of clusters based on an unsupervised machine learning algorithm. This unsupervised machine learning algorithm finds all clusters of suspicious flows in the target flow set automatically without requiring the number of clusters to be specified. The cluster analyzer (209) uses both flow-based features (i.e., the aforementioned feature vectors) and corresponding payloads stored in the flow storage (207) for creating clusters in the flow storage (207).

In one or more embodiments, a new behavior model is generated, in response to the target flow set being clustered, from a cluster by the statistical model generator (208) and added to the statistical models (215) for use by the statistical classifier (204). In one or more embodiments, generating new behavior model is contingent upon validation and labeling of a signature generated from the cluster, as described below.

In one or more embodiments, the signature generator (214) is configured to analyze each cluster in the flow storage (207) to generate a new signature representing data characteristics associated with suspicious flows in the cluster. For example, the new signature is a layer 7 signature generated by analyzing layer 7 contents of suspicious flows in the cluster. In one or more embodiments, the signature generator (214) analyzes the similarity in the layer 7 payloads in the cluster to generate the new signature. Once generated, the new signature is added to the signature library (203) to augment the previously collected signatures, e.g., from the host module (101) of FIG. 1A. For example, the generated new signatures may be communicated to the security experts operating the host module (101) to be validated and labeled before adding into the signature library (203).

In one or more embodiments, the statistical model generator (208) is further configured to update the group behavioral model in response to adding the new signature to the signature library (203) based on an expanded set of historical flows matching the expanded signature library (203). Accordingly, the statistical classifier (204) is further configured to update the target flow set in response to updating the group behavioral model.

In one or more embodiments, the system (200) further includes a situation awareness module (210) that is configured to identify suspicious hosts in the data network (220) based on malicious activities identified by the statistical classifier (204). In one or more embodiments, analyzing the target flow set and generating the new signature include analyzing association of suspicious flows, identified by the statistical classifier (204), with the suspicious hosts identified by the a situation awareness module (210).

The supervised and unsupervised machine learning algorithms used by the statistical model generator (208) and the cluster analyzer (209) identify the malicious flows in the network using mostly flow level data. In one or more embodiments, the reputation of individual hosts and/or their proximity from the known malicious networks is leveraged to assist in identifying malicious behavior. The situation awareness module (210) focuses on the communication graph of the data network (220) to accomplish the following three tasks. Firstly, situation awareness module (210) augments the machine learning analysis with additional information on hosts involved in the flows considered for evaluation, i.e., the aforementioned set of historical flows and/or the target flow set. Secondly, situation awareness module (210) identifies behavioral properties of malicious hosts. Often, a compromised machine (e.g., a malicious host) is susceptible to multiple threats and exhibits other anomalies that are not already detected. Thirdly, situation awareness module (210) models the communication behavior of malicious hosts such that similar behavior of some other hosts in the data network (220) can be detected. We can identify some stealthy malicious behavior with this analysis which remains undetected otherwise.

As noted above, all the flow information, including payloads, flow-based features, and the corresponding labels are stored in the flow storage (207). In one or more embodiments, distributed systems (e.g., Hadoop cluster known to those skilled in the art) are used for managing the large amount of data stored in the flow storage (207). Such distributed system includes data loader (205) configured to load the data into the distributed file systems, the PU (206) configured as distributed computing facilities, and job controller (213) configured to schedule and manage supervised machine learning, unsupervised machine learning, and situation awareness analytic tasks that are submitted to the PU (206).

Figure 2:
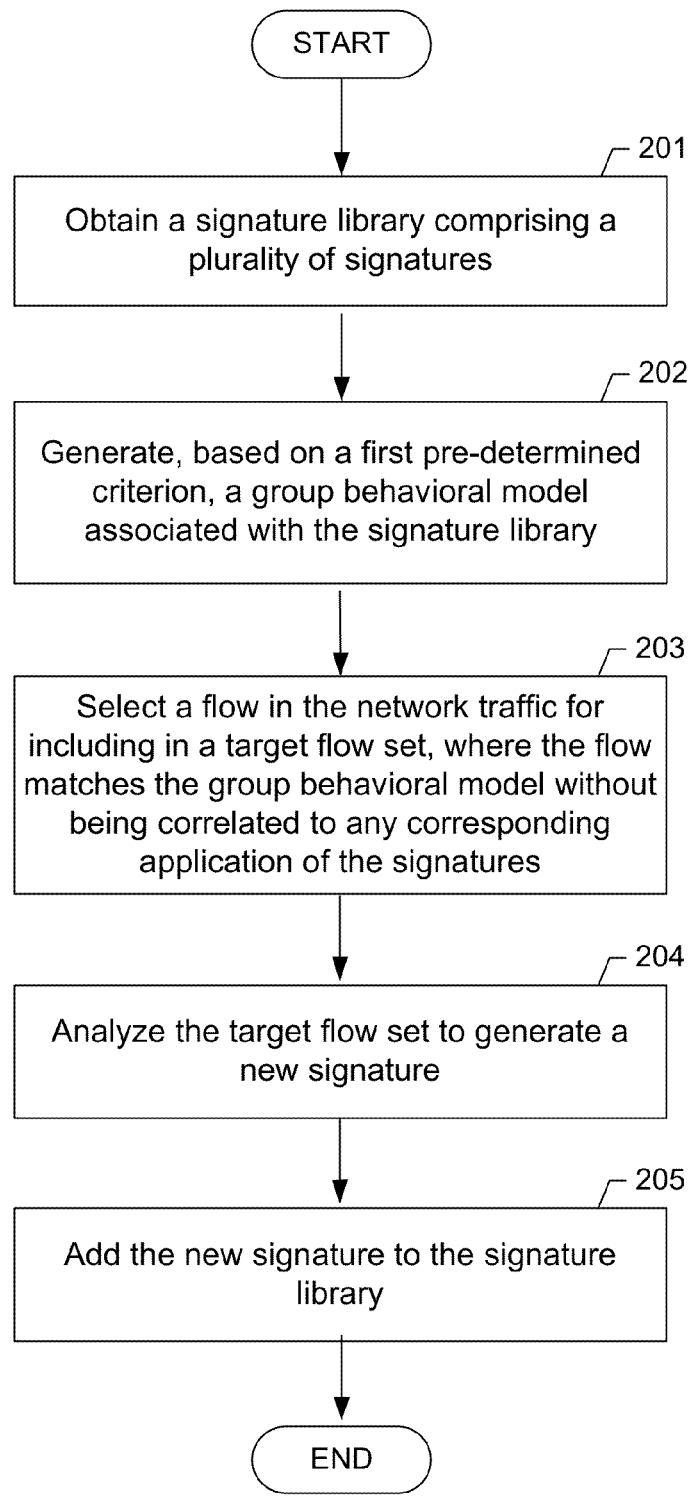
FIG. 2 shows a method flow chart according to aspects of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the method depicted in FIG. 2 may be practiced using system (200) described with respect to FIG. 1B above.

Initially in Step 201, a signature library is obtained that includes signatures each representing data characteristics associated with a corresponding application executing in a network. In one or more embodiments, these signatures are layer 7 signatures. An example signature library is described in reference to FIG. 1B above.

In Step 202, a group behavioral model associated with the signature library is generated based on a pre-determined criterion. Specifically, the group behavioral model represents a common behavior of a set of historical flows identified from the network traffic, wherein each of the signatures correlates to a subset of the plurality of historical flows. An example group behavioral model is described in reference to FIG. 1B and FIG. 3A above.

In Step 203, a flow in the network traffic is selected for including in a target flow set, where the flow matches the group behavioral model without being correlated to any corresponding application of the signatures. In one or more embodiments, selecting the flow in the network traffic for including in the target flow set includes: (i) analyzing the flow based on a pre-determined criterion to identify the flow as matching the group behavioral model, (ii) determining a correlation between the flow and any corresponding application of the signatures as not meeting a pre-determined threshold, and (iii) including, in response to identifying the flow as matching the group behavioral model and the correlation not meeting the pre-determined threshold, the flow in the target flow set. An example target flow set is described in reference to FIG. 1B above.

In Step 204, the target flow set is analyzed to generate a new signature. In one or more embodiments, analyzing the target flow set to generate the new signature includes: (i) analyzing, in response to a size of the target flow set exceeding a pre-determined size, the target flow set to identify a number of clusters in the target flow set, and (ii) analyzing at least one cluster of the plurality of clusters to generate the new signature representing data characteristics associated with the at least one cluster.

In Step 205, the new signature is added to the signature library. Accordingly, the group behavioral model and the target flow set are updated in response to adding the new signature to the signature library.

More details of the method steps depicted in FIG. 2 are described in the example data flow diagrams depicted in FIGS. 3B and 3C below.

Figure 3B:
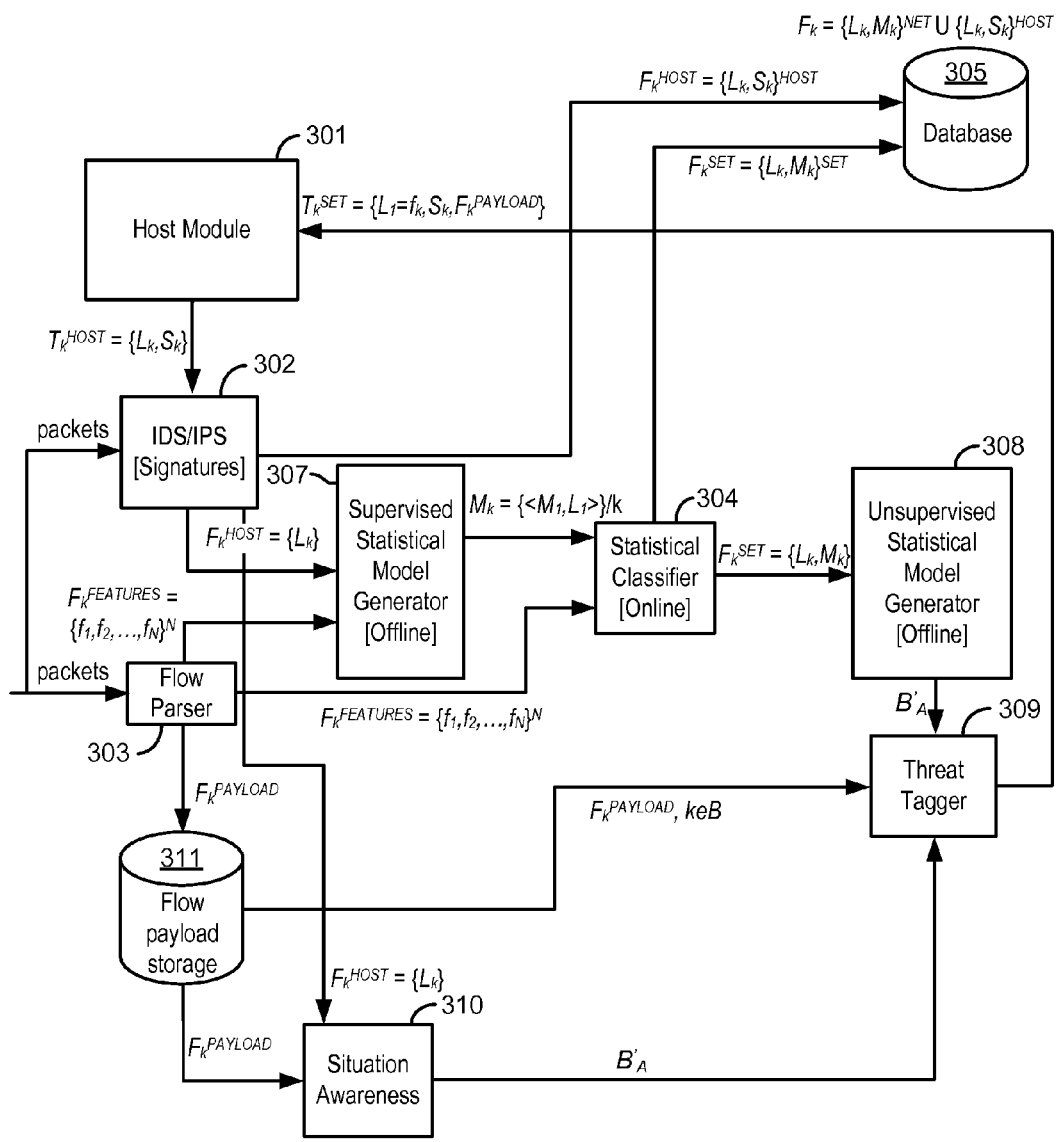
Figure 3C:
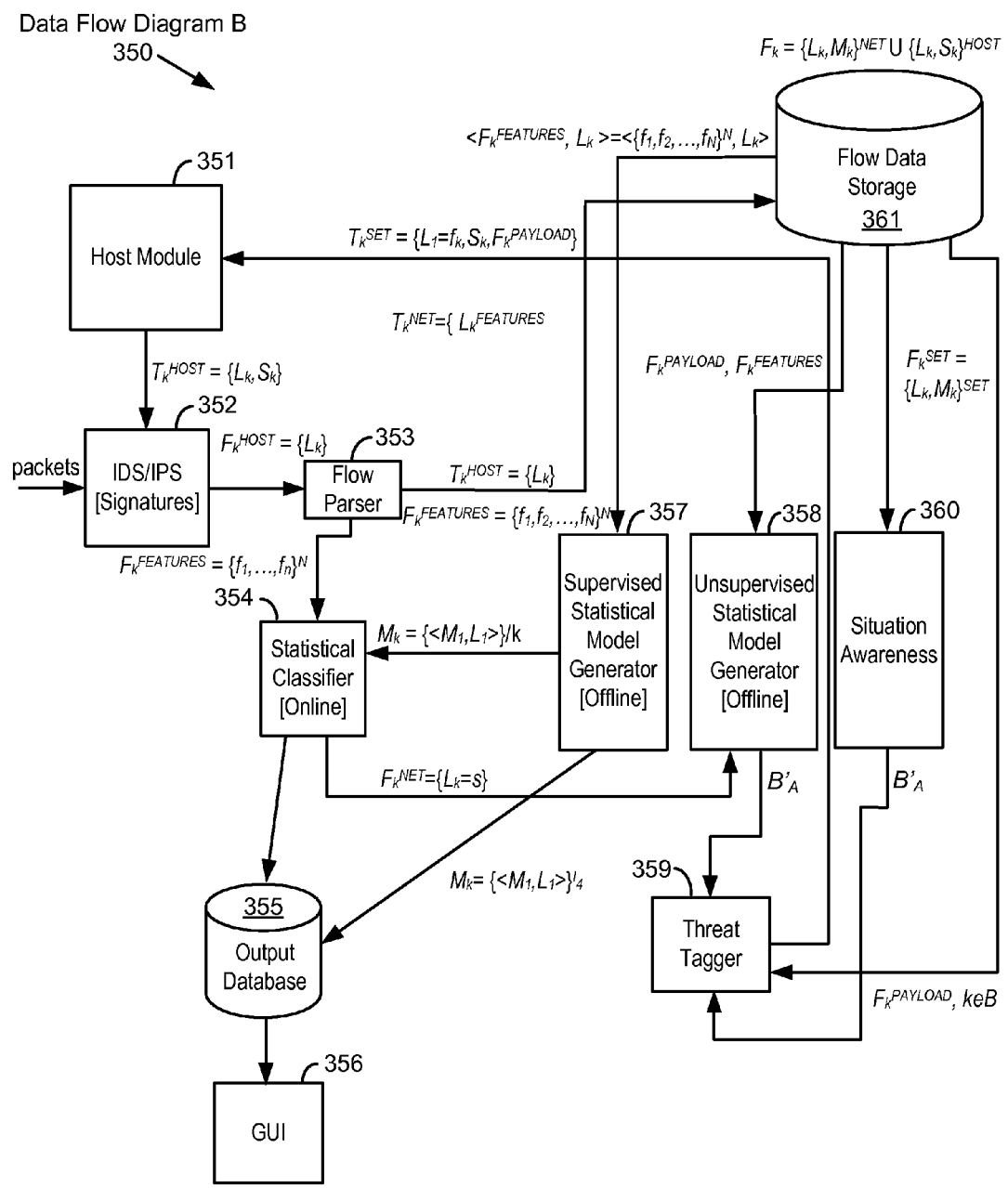

FIGS. 3B and 3C show a data flow diagram A (340) and data flow diagram B (350), respectively, in accordance with one or more embodiments of the invention. Those skilled in the art, having the benefit of this detailed description, will appreciate the components shown in FIGS. 3B and 3C may differ among embodiments of the invention, and that one or more of the components may be optional. Although specific numbers of components are shown in FIGS. 3B and 3C, different number of each component may be included. In one or more embodiments of the invention, one or more of the components shown in FIGS. 3B and 3C may be omitted, repeated, supplemented, and/or otherwise modified from that shown in FIGS. 3B and 3C. Accordingly, the specific arrangement of components shown in FIGS. 3B and 3C should not be construed as limiting the scope of the invention. In one or more embodiments of the invention, the data flows depicted in FIGS. 3A and 3B may be practiced using system (200) and the corresponding method described with respect to FIGS. 1B and 2, respectively.

As shown in FIG. 3B, the data flow diagram A (340) includes host module (301) that corresponds to the host module (101) of FIG. 1A and is configured to generate payload based signatures for different malicious activities for providing to IDS/IPS (302) to detect malicious flows. The IDS/IPS (302) corresponds to IDS/IPS (106) of FIG. 1A or the pattern matching engine (202) of FIG. 1B. This is essentially an offline process and whenever a new threat signature is generated by the host module (301), IDS/IPS (302) is provided with the new additional signatures.

The input to the data flow diagram A (340) is the sequence of IP packets as being captured by the IDS/IPS (302) and the flow parser (303). These packets are then processed by the flow parser (303), which aggregates packets into flows. It computes a set of N different statistical layer 3/layer 4 information for each flow (i.e., $F_k^{FEATURES}=\{f_1, \ldots, f_n\}^N$), as well as extracts layer 7 payload associated with each of these flows ($F_k^{PAYLOAD}$). The flow payloads are then passed through the IDS/IPS (302) that has already loaded all the layer 7 payload based signatures for different threats generated by the host module (301). Notice that the set of signatures will be updated regularly by the host module (301) whenever any newly discovered signature becomes available. When a flow matches any of the signatures (referred to as a positive match), the IDS/IPS (302) tags the flow as known/bad; in case the flow does not match any of the signatures (referred to as a negative match), then the flow is tagged unknown. This type of tagging is referred to as macro-level tagging using only two types of tags, the known/bad tag and the unknown tag. Furthermore, in case of a positive match, the IDS/IPS (302) will append to the macro-level tag an extra inner tag that reflects the specific type of threat the flow has matched. This type of tagging is referred to as micro-level tagging, denoted as $F_k^{HOST}=\{L_k\}$ in FIG. 3B. For example, a flow matching the Conficker-Worm-version-A signature will be tagged by the IDS/IPS (302) with macro-level tag <known/bad> and micro-level tag <cw-v.a>, i.e., $F_k^{HOST}=\{known,bad,cw-v.a.\}$. For each processed flow, the vector of layer 3/layer 4 statistical features $F_k^{FEATURES}=\{f_1, \ldots, f_n\}^N$ is also extracted. The flow is then stored in the flow payload storage (311). For each flow, the flow payload storage (311) stores the payloads, layer 3/layer 4 feature information, and the corresponding label (i.e., macro-level tag, micro-level tag), which are used as a training example for the supervised statistical model generator (307). Specifically, supervised statistical model generator (307) operates in offline manner to extract statistical models based on the layer 3/layer 4 features to capture both the coarse behavior separating known/bad flows from unknown flows as well as the specific behavior of each type of threat within the known/bad flows. As discussed in reference to FIG. 1B above, the coarse behavior is captured in a group behavior model for macro-level profiling while the specific behavior of each type of threat is captured in a threat specific behavior model for micro-level profiling. In particular, these layer 3/layer 4 flow feature based models correspond to the statistical model (215) of FIG. 1B.

The online statistical classifier (304) uses all the flow-feature based models generated by the supervised statistical model generator (307) for identifying different threats in real time. Based on these models, the online statistical classifier (304) generates a macro-level label (known/bad or unknown) for each flow classified and a micro-level label for the flow with the bad label. In a training phase, the results of the online statistical classifier (304) are calibrated with the layer 7 signature matching by the IDS/IPS (302). In addition, the online statistical classifier (304) also generates a "suspicious" flag for any flow that is classified as bad but not classified with any of the micro-labels with some level of confidence. All the output of the online statistical classifier (304) is stored in the database (305) with flow ids.

Return to the discussion of the supervised statistical model generator (307) that works on flows stored in the flow payload storage (311). It uses all the flow-features (not payloads) with the corresponding threat labels and generates two types of statistical models reflecting two different levels of granularity in the grouping. When the supervised statistical model generator (307) generates the macro-level model, it generates a model to separate all the flows with known/bad label and the flows with unknown label. Such a model will label all the new flows with the macro-label known/bad (or unknown) which are similar to the previous known/bad (or unknown) flows. The second level of grouping is achieved by expanding the known/bad flows into J distinct malware classes, where each class j=1, . . . , J represents a specific type of threat that has produced at least a flow with a positive match. For both the macro-class and micro-class classification, the supervised statistical model generator (307) uses machine learning algorithms on the group of provided statistical features to create statistical models that retain the hidden properties of each of the constructed groups. For the macro-level grouping, this module produces one statistical model that separates the known/bad flows and the unknown flows. For the micro-level grouping, the supervised statistical model generator (307) produces J statistical models for identifying each of the j=1, . . . , J threats.

At each regular time [t], the statistical models and the associated malware tags (i.e., $M_{[t]}=\{<M_j,L_j>\}_{j=1}^J$) are provided to an online statistical classifier (304) that uses the newly generated models to discover threat patterns in incoming flows. For example, when threats hide themselves in encrypted flows, payload-based signatures are known to be inadequate. If these threats or similar threats have been analyzed in the past in non-encrypted flows, a correct statistical model representative of their behavior exists and can be used to detect such threats hiding behind encrypted flows. Furthermore, in the case of zero-day threats (i.e., threats never seen before and thus no signature or statistical model was available at the time of the training), they can still be detected if their behavior still falls in the statistical model of known/bad traffic. In the latter case, the online statistical classifier (304) will use the label "suspicious" to tag these flows (L=<"s">) and store the associated flow identifiers for further analysis. When enough suspicious flows have been observed, then an off-line process is initiated to resolve the number of distinct threat classes these flows may belong to. This off-line process is performed by the unsupervised statistical model generator (308) that uses unsupervised machine learning techniques to identify the number of hidden threat clusters present in the set of suspicious flows (i.e., suspicious clusters of cardinality I). For each cluster, the suspicious flows that behave similarly in terms of communication pattern are identified and stored in one of the flow-buckets $B_{i=1}^I$=i=1, . . . , 1. Each flow-bucket is then forwarded to the threat tagger (309) that extracts the flow identifiers, retrieves the correspondent flow payloads from the flow payload storage (311), and analyzes the flow payloads to automatically extract the threat payload signature. The treat tagger (309) corresponds to the signature generator (214) depicted in FIG. 1B above. Signatures for each newly discovered flow-bucket is then forwarded, e.g., via the module (301), to the IDS/IPS (302) that will start using them for tagging/labeling incoming flows.

Although successful in extracting the payload signature of the newly discovered malware, the threat tagger (309) will not be able to retrieve the associated label (marked <L=?>). In order to overcome this limitation, the threat tagger (309) shares specific information with the host module (301). More specifically, any executable found by the threat tagger (309) in any of the flow in a flow-bucket is forwarded to the host module (301) for retrieving the unknown threat label. In case no executable can be found, the threat tagger (309) provides the host module (301) with labels of the set of known/bad threats with which the new threat shares the highest level of behavioral structure. The host module (301) then compares whether such behavioral similarity is shared at the state machine level as well. If so, the host module (301) generates an internal label to track the new threat until a formal label available, e.g., formally recognized by the malware research community.

As shown in FIG. 3C, the data flow diagram B (350) includes essentially the same components as the data flow diagram A (340) depicted in FIG. 3B with the exception that the data flow arrows are arranged to emphasize a serial configuration for ease of physical implementation. For example, an arrow between modules of the data flow diagram B (350) represent output data generated by a source module that may or may not be appended to at least a portion of input data passed through the source module. As shown, the host module (351), IDS/IPS (352), flow parser (353), statistical classifier (354), output database (355), flow data storage (361), supervised statistical model generator (357), unsupervised statistical model generator (358), threat tagger (359), and situation awareness module (360) correspond to the host module (301), IDS/IPS (302), flow parser (303), statistical classifier (304), database (305), flow payload storage (311), supervised statistical model generator (307), unsupervised statistical model generator (308), threat tagger (309), and situation awareness module (310) depicted in FIG. 3B above. Accordingly, the data flow operations depicted in FIG. 3A are essentially the same as those depicted in FIG. 3B above. Further, the GUI (356) corresponds to the GUI (212) depicted in FIG. 1B above.

Figure 4:
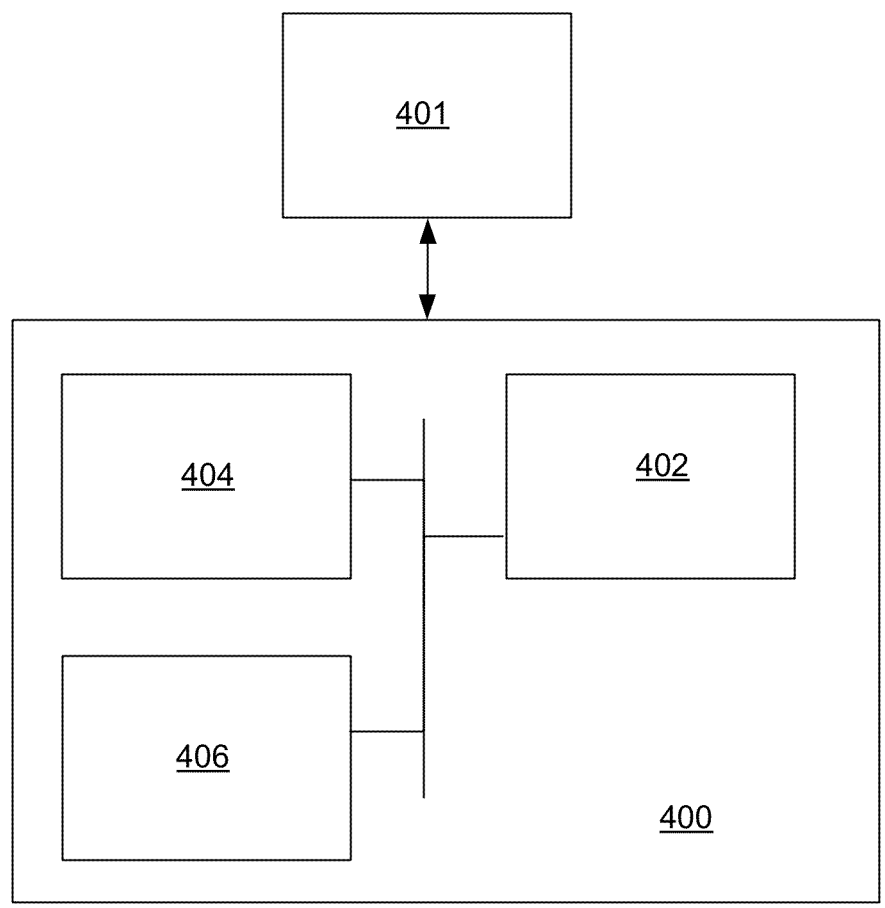
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for profiling network traffic of a network, comprising:
obtaining a signature library comprising a plurality of first network data layer signatures each representing first data characteristics associated with a corresponding application executing in the network, wherein the plurality of first network data layer signatures are generated by analyzing a first network data layer using a payload based signature generation algorithm;
generating, by a processor of a computer system using a statistical feature based signature generation algorithm, a second network data layer group behavioral model associated with the signature library, wherein the second network data layer group behavioral model represents a common behavior in a second network data layer of a plurality of historical flows identified from the network traffic, wherein the first network data layer and the second network data layer are identified by a hierarchical network data model of the network traffic, wherein each of the plurality of first network data layer signatures correlates to a subset of the plurality of historical flows;
generating a target flow set based on the second network data layer group behavioral model applied to the second network data layer, comprising:
selecting, by the processor, a flow in the network traffic for including in a target flow set, wherein the second network data layer of the flow matches the second network data layer group behavioral model, wherein the first network data layer of the flow is not correlated to any of the plurality of first network data layer signatures; and
expanding, in response to generating the target flow set based on the second network data layer group behavioral model applied to the second network data layer, the signature library based on the payload based signature generation algorithm applied to the first network data layer, comprising:

analyzing, by the processor using the payload based signature generation algorithm, the target flow set to generate a new first network data layer signature; and
adding the new first network data layer signature to the signature library.

2. The method of claim 1,
wherein selecting the flow in the network traffic for including in the target flow set comprises:
analyzing the flow based on a second pre-determined criterion to identify the flow as matching the second network data layer group behavioral model;
determining a correlation between the flow and any corresponding application of the plurality of first network data layer signatures as not meeting a pre-determined threshold; and
including, in response to identifying the flow as matching the second network data layer group behavioral model and the correlation not meeting the pre-determined threshold, the flow in the target flow set;
wherein analyzing the target flow set to generate the new first network data layer signature comprises:
analyzing, in response to a size of the target flow set exceeding a pre-determined size, the target flow set to identify a plurality of clusters in the target flow set; and
analyzing at least one cluster of the plurality of clusters to generate the new first network data layer signature representing second data characteristics associated with the at least one cluster,
the method further comprising updating the second network data layer group behavioral model and the target flow set in response to adding the new first network data layer signature to the signature library.

3. The method of claim 1, further comprising:
identifying each subset of the plurality of historical flows from the network traffic based on a matched first network data layer signature in the plurality of first network data layer signatures; and
analyzing the flow based on the plurality of first network data layer signatures to determine the correlation between the flow and any corresponding application of the plurality of first network data layer signatures.

4. The method of claim 1, further comprising:
analyzing, for each of the plurality of first network data layer signatures, a matched subset of the plurality of historical flows to generate a corresponding behavioral model; and
analyzing, based on the corresponding behavioral model for each of the plurality of first network data layer signatures and without using the plurality of first network data layer signatures, the flow to determine the correlation between the flow and any corresponding application of the plurality of first network data layer signatures.

5. The method of claim 1,
wherein each first data characteristics of the plurality of first network data layer signatures is associated with a malicious activity generated by the corresponding application, and
wherein the second network data layer group behavioral model comprises a threat model.

6. The method of claim 5, further comprising:
identifying a plurality of suspicious hosts in the network based on the malicious activity,
wherein analyzing the target flow set to generate the new first network data layer signature further comprises analyzing the flow based on association with the plurality of suspicious hosts.

7. The method of claim 1,
wherein each of the plurality of first network data layer signatures comprises a layer 7 signature.

8. The method of claim 1,
wherein analyzing the at least one cluster of the plurality of clusters to generate the new first network data layer signature comprises analyzing layer 7 contents of the at least one cluster of the plurality of clusters.

9. The method of claim 1,
wherein generating the second network data layer group behavioral model comprises analyzing layer 3 and layer 4 contents of the plurality of historical flows based on a supervised machine learning algorithm, and
wherein generating the corresponding behavioral model comprises analyzing layer 3 and layer 4 contents of the matched subset of the plurality of historical flows based on the supervised machine learning algorithm.

10. The method of claim 1,
wherein analyzing the target flow set to identify the plurality of clusters is based on an unsupervised machine learning algorithm.

11. A system for profiling network traffic of a network, comprising:
a signature library comprising a plurality of first network data layer signatures each representing first data characteristics associated with a corresponding application executing in the network, wherein the plurality of first network data layer signatures are generated using a payload based signature generation algorithm;
a processor of a computer system; and
memory storing instructions executable by the processor, the instructions comprising:
a statistical model generator configured to generate, using a statistical feature based signature generation algorithm, a second network data layer group behavioral model associated with the signature library, wherein the second network data layer group behavioral model represents a common behavior of a plurality of historical flows identified from the network traffic, wherein each of the plurality of first network data layer signatures correlates to a subset of the plurality of historical flows;
a statistical classifier configured to generate a target flow set based on the second network data layer group behavioral model applied to the second network data layer, wherein generating the target flow set comprises:
select a flow in the network traffic for including in a target flow set, wherein the second network data layer of the flow matches the second network data layer group behavioral model, wherein the first network data layer of the flow is not correlated to any of the plurality of first network data layer signatures; and
a signature generator configured to expand, in response to generating the target flow set based on the second network data layer group behavioral model applied to the second network data layer, the signature library based on the payload based signature generation algorithm applied to the first network data layer, wherein expanding the signature library comprises:
analyze, using the payload based signature generation algorithm, the target flow set to generate a new first network data layer signature; and
add the new first network data layer signature to the signature library.

12. The system of claim 11,
wherein the statistical classifier is further configured to:
analyze the flow based on a second pre-determined criterion to identify the flow as matching the second network data layer group behavioral model;
determine a correlation between the flow and any corresponding application of the plurality of first network data layer signatures as not meeting a pre-determined threshold; and
include, in response to identifying the flow as matching the second network data layer group behavioral model and the correlation not meeting the pre-determined threshold, the flow in the target flow set,
wherein the system further comprises a cluster analyzer executing on the processor and configured to analyze, in response to a size of the target flow set exceeding a pre-determined size, the target flow set to identify a plurality of clusters in the target flow set, and
wherein the signature generator is further configured to analyze at least one cluster of the plurality of clusters to generate the new first network data layer signature representing second data characteristics associated with the at least one cluster.

13. The system of claim 11,
wherein the statistical model generator is further configured to update the second network data layer group behavioral model in response to adding the new first network data layer signature to the signature library, and
wherein the statistical classifier is further configured to update the target flow set in response to adding the new first network data layer signature to the signature library.

14. The system of claim 11, further comprising a pattern matching engine configured to:
identify each subset of the plurality of historical flows from the network traffic based on a matched first network data layer signature in the plurality of first network data layer signatures; and
analyze the flow based on the plurality of first network data layer signatures to determine the correlation between the flow and any corresponding application of the plurality of first network data layer signatures.

15. The system of claim 11,
wherein the statistical model generator is further configured to analyze, for each of the plurality of first network data layer signatures, a matched subset of the plurality of historical flows to generate a corresponding behavioral model, and
wherein the statistical classifier is further configured to analyze, based on the corresponding behavioral model for each of the plurality of first network data layer signatures and without using the plurality of first network data layer signatures, the flow to determine the correlation between the flow and any corresponding application of the plurality of first network data layer signatures.

16. The system of claim 11,
wherein each first data characteristics of the plurality of first network data layer signatures is associated with a malicious activity generated by the corresponding application, and
wherein the second network data layer group behavioral model comprises a threat model.

17. The system of claim 16, further comprises a situation awareness module configured to:
identify a plurality of suspicious hosts in the network based on the malicious activity,
wherein analyzing the target flow set and generating the new first network data layer signature comprise analyzing the flow based on association with the plurality of suspicious hosts.

18. The system of claim 11,
wherein each of the plurality of first network data layer signatures comprises a layer 7 signature.

19. The system of claim 11,
wherein analyzing the at least one cluster of the plurality of clusters to generate the new first network data layer signature comprises analyzing layer 7 contents of the at least one cluster of the plurality of clusters.

20. The system of claim 11,
wherein generating the second network data layer group behavioral model comprises analyzing layer 3 and layer 4 contents of the plurality of historical flows based on a supervised machine learning algorithm, and
wherein generating the corresponding behavioral model comprises analyzing layer 3 and layer 4 contents of the matched subset of the plurality of historical flows based on the supervised machine learning algorithm.

21. The system of claim 11,
wherein analyzing the target flow set to identify the plurality of clusters is based on an unsupervised machine learning algorithm.

22. A non-transitory computer readable medium, embodying instructions to profile network traffic of a network, the instructions when executed by the computer comprising functionality for:
obtaining a signature library comprising a plurality of first network data layer signatures each representing first data characteristics associated with a corresponding application executing in the network, wherein the plurality of first network data layer signatures are generated using a payload based signature generation algorithm;
generating, using a statistical feature based signature generation algorithm, a second network data layer group behavioral model associated with the signature library, wherein the second network data layer group behavioral model represents a common behavior of a plurality of historical flows identified from the network traffic, wherein each of the plurality of first network data layer signatures correlates to a subset of the plurality of historical flows; and
profiling the network traffic, based on a combination of the payload based signature generation algorithm and the statistical feature based signature generation algorithm, by at least:
selecting a flow in the network traffic for including in a target flow set, comprising:
analyzing the flow based on a second pre-determined criterion to identify the second network data layer of the flow as matching the second network data layer group behavioral model;
determining a correlation between the first network data layer the flow and any of the plurality of first network data layer signatures as not meeting a pre-determined threshold; and
including, in response to identifying the flow as matching the second network data layer group behavioral model and the correlation not meeting the pre-determined threshold, the flow in the target flow set;
analyzing, using the payload based signature generation algorithm, the target flow set to generate a new first network data layer signature, comprising:

analyzing, in response to a size of the target flow set exceeding a pre-determined size, the target flow set to identify a plurality of clusters in the target flow set; and analyzing at least one cluster of the plurality of clusters to generate the new first network data layer signature representing second data characteristics associated with the at least one cluster; and adding the new first network data layer signature to the signature library, wherein the network traffic is profiled based at least on the new first network data layer signature.

23. The non-transitory computer readable medium of claim 22, the instructions when executed by the computer further comprising functionality for:

updating the second network data layer group behavioral model and the target flow set in response to adding the new first network data layer signature to the signature library.

24. The non-transitory computer readable medium of claim 22, the instructions when executed by the computer further comprising functionality for:

identifying each subset of the plurality of historical flows from the network traffic based on a matched first network data layer signature in the plurality of first network data layer signatures; and analyzing the flow based on the plurality of first network data layer signatures to determine the correlation between the flow and any corresponding application of the plurality of first network data layer signatures.

25. The non-transitory computer readable medium of claim 22, the instructions when executed by the computer further comprising functionality for:

analyzing, for each of the plurality of first network data layer signatures, a matched subset of the plurality of historical flows to generate a corresponding behavioral model; and analyzing, based on the corresponding behavioral model for at least one of the plurality of first network data layer signatures and without using the plurality of first network data layer signatures, the flow to determine the correlation between the flow and any corresponding application of the plurality of first network data layer signatures.

26. The non-transitory computer readable medium of claim 22, wherein each first data characteristics of the plurality of first network data layer signatures is associated with a malicious activity generated by the corresponding application, and wherein the second network data layer group behavioral model comprises a threat model.

27. The non-transitory computer readable medium of claim 26, the instructions when executed by the computer further comprising functionality for:

identifying a plurality of suspicious hosts in the network based on the malicious activity, wherein analyzing the target flow set to generate the new first network data layer signature further comprises analyzing the flow based on association with the plurality of suspicious hosts.

28. The method of claim 1, wherein the target flow set is analyzed, to generate the new first network data layer signature, separate from any flow correlating to any corresponding application of the plurality of first network data layer signatures, and wherein the method further comprises updating the second network data layer group behavioral model in response to adding the new first network data layer signature to the signature library.

29. The system of claim 1, wherein the target flow set is analyzed, to generate the new first network data layer signature, separate from any flow correlating to any corresponding application of the plurality of first network data layer signatures, and wherein the statistical model generator is further configured to update the second network data layer group behavioral model in response to adding the new first network data layer signature to the signature library.

30. The non-transitory computer readable medium of claim 22, wherein the target flow set is analyzed, to generate the new first network data layer signature, separate from any flow correlating to any corresponding application of the plurality of first network data layer signatures, and wherein the instructions when executed by the computer further comprising functionality for updating the second network data layer group behavioral model in response to adding the new first network data layer signature to the signature library.

* * * * *